US005701510A

United States Patent [19]

Johnson et al.

[11] Patent Number: 5,701,510
[45] Date of Patent: Dec. 23, 1997

[54] METHOD AND SYSTEM FOR EFFICIENT DESIGNATION AND RETRIEVAL OF PARTICULAR SEGMENTS WITHIN A MULTIMEDIA PRESENTATION UTILIZING A DATA PROCESSING SYSTEM

[75] Inventors: William J. Johnson, Flower Mound; Robert Scott Keller, Grapevine; George C. Manthuruthil, Coppell; Marvin L. Williams, Lewisville, all of Tex.

[73] Assignee: International Business Machines Corporation, Armonk, N.Y.

[21] Appl. No.: 791,838

[22] Filed: Nov. 14, 1991

[51] Int. Cl.$^6$ .................................................. G06T 1/00
[52] U.S. Cl. ........................................ 395/806; 395/326
[58] Field of Search ................................ 395/152–155, 395/162; 377/17; 360/73.05, 73.08, 78.07; 369/19–20, 24, 27, 44, 182, 227

[56] References Cited

U.S. PATENT DOCUMENTS 4,058,826 11/1977 Schneider .................... 358/10
4,203,063 5/1980 Loeb et al. ................... 318/603
4,357,643 11/1982 d'Alayer de Costemore d'Arc .... 360/137
5,109,482 4/1992 Bohrman ..................... 395/154
5,237,648 8/1993 Mills et al. ................... 395/133

Primary Examiner—Joseph H. Feild
Attorney, Agent, or Firm—Edward H. Duffield; Lisa B. Yociss; Andrew J. Dillon

[57] ABSTRACT

A method and system utilizing a data processing system for the efficient designation and retrieval of particular segments within a multimedia presentation. Operation of the multimedia presentation may be controlled by operation of a plurality of data processing system user interface commands. A digital counter is established for multimedia presentations which do not have an existing digital counter, or for multimedia presentations which have an existing digital counter whose output may not be accessed by the data processing system. Thereafter, a particular rate of change for the digital counter is correlated with each user interface command which has been registered within the data processing system, enabling a user to thereafter access and automatically position particular segments within the multimedia presentation in a random order utilizing the user interface commands.

17 Claims, 6 Drawing Sheets

METHOD AND SYSTEM FOR EFFICIENT DESIGNATION AND RETRIEVAL OF PARTICULAR SEGMENTS WITHIN A MULTIMEDIA PRESENTATION UTILIZING A DATA PROCESSING SYSTEM

BACKGROUND OF THE INVENTION

1. Technical Field

The present invention relates in general to improved computer systems and in particular to a system for selectively designating and retrieving particular segments within a multimedia presentation. Still more particularly, the present invention relates to a method and system for systematically correlating user interface commands with particular rates of change of a digital counter wherein user interface commands may be utilized to accurately designate and retrieve particular segments within a multimedia presentation.

2. Description of the Related Art

Multimedia presentation devices such as VCR's, tape players, and camcorders are widely available and very popular. Such devices normally allow a user to play, reverse, fast forward, and slow forward through a multimedia presentation. Some devices of this type provide a counter that a user may utilize in order to locate particular segments recorded in a presentation. Such counters permit users to "mark" a segment by resetting the counter to zero at the location of the segment and thereafter automatically returning to that location utilizing one of the user interface commands, such as fast forward. In this manner, a user may mark a single segment of a multimedia presentation, but in doing so the position of all other segments is lost.

In a computer based multimedia environment having presentations which are produced by different types of presentation devices, locating particular segments is an even more difficult task. One presentation device may operate at a selected speed for a particular user interface command which is different from the speed of another device for that same command. Therefore, a single counter may not be utilized to accurately locate specified segments of a multimedia presentation in multiple presentation devices.

It should therefore be apparent that a need exists for a method and system whereby each user interface command within a multimedia presentation system may be correlated with a particular rate of change, thereby enabling a user to access particular segments within a multimedia presentation in a random order utilizing existing user interface commands.

SUMMARY OF THE INVENTION

It is therefore one object of the present invention to provide an improved method and system for the efficient designation and retrieval of particular segments of a multimedia presentation.

It is another object of the present invention to provide an improved method and system for the accessing of particular segments of a computer based multimedia presentation in a random order utilizing a plurality of user interface commands.

It is yet another object of the present invention to provide an improved method and system for the efficient designation and retrieval of a plurality of particular segments within a computer based multimedia presentation by correlating user interface commands with a particular rate of change of a digital counter so that particular segments of a multimedia presentation may be accessed in a random order.

The foregoing objects are achieved as is now described. A method and system utilizing a data processing system are disclosed for the efficient designation and retrieval of particular segments within a multimedia presentation. Operation of the multimedia presentation may be controlled by operation of a plurality of data processing system user interface commands. A digital counter is established for multimedia presentations which do not have an existing digital counter, or for multimedia presentations which have an existing digital counter whose output may not be accessed by the data processing system. Thereafter, a particular rate of change for the digital counter is correlated with each user interface command which has been registered within the data processing system, enabling a user to thereafter access and automatically position particular segments within the multimedia presentation in a random order utilizing the user interface commands.

BRIEF DESCRIPTION OF DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
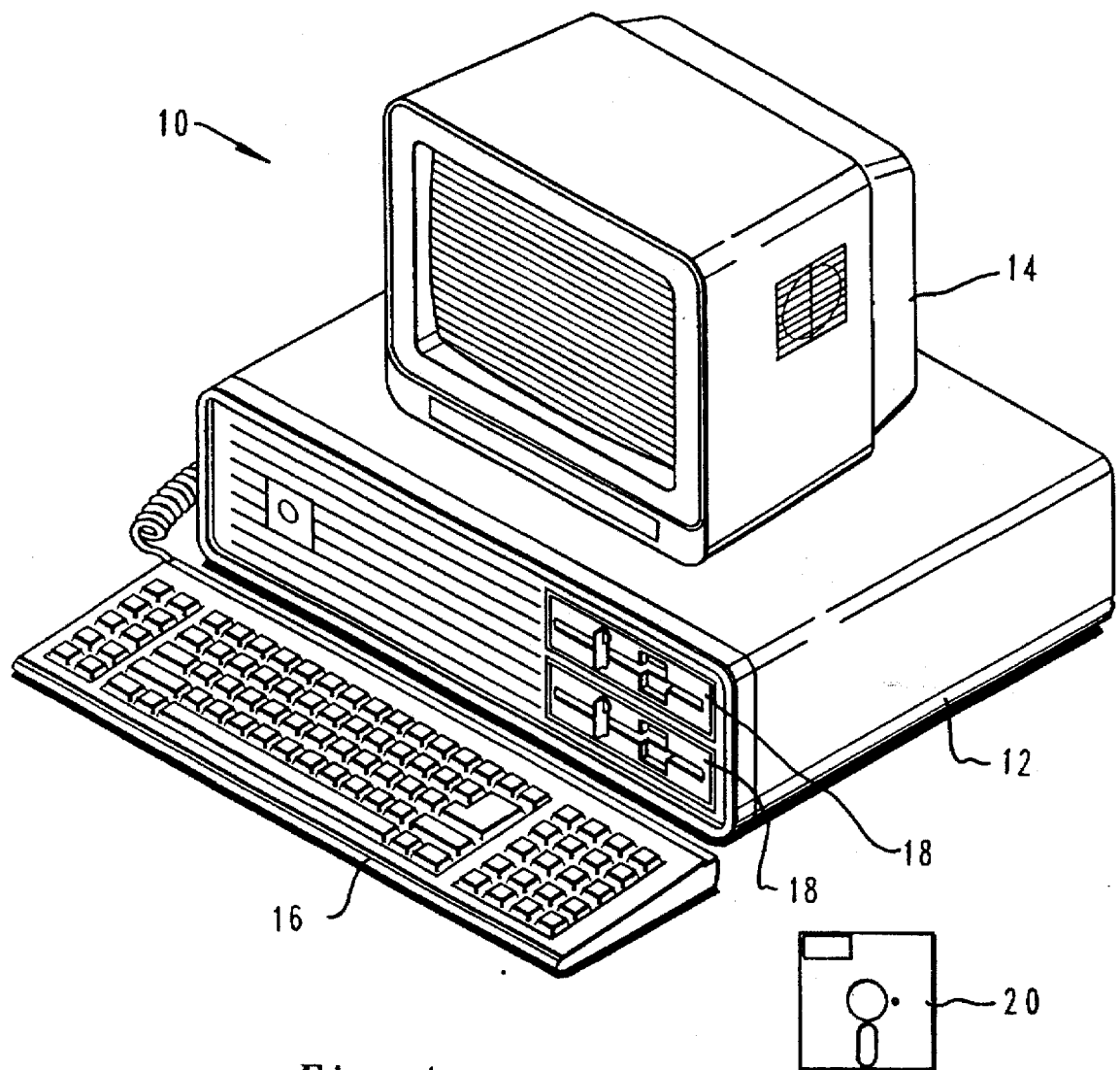
FIG. 1 is a pictorial representation of a personal computer system which may be utilized to implement the method and system of the present invention.

With reference now to the figures and in particular with reference to FIG. 1, there is depicted a pictorial representation of a data processing system 10 which may be utilized in accordance with the method and system of the present invention. Data processing system 10 preferably includes a processor 12, preferably provided by utilizing an International Business Machines Personal System/2 or similar system. Data processing system 10 generally includes a video display device 14, keyboard 16, and disk drive 18. Video display device 14 and keyboard 16 may be utilized to allow user input to processor 12 and to provide user discernable messages. A data storage means 20, such as a magnetic disk, may be utilized to store data representations of various multimedia presentations which may be accessed by processor 12 by utilizing disk drive 18.

Figure 2:
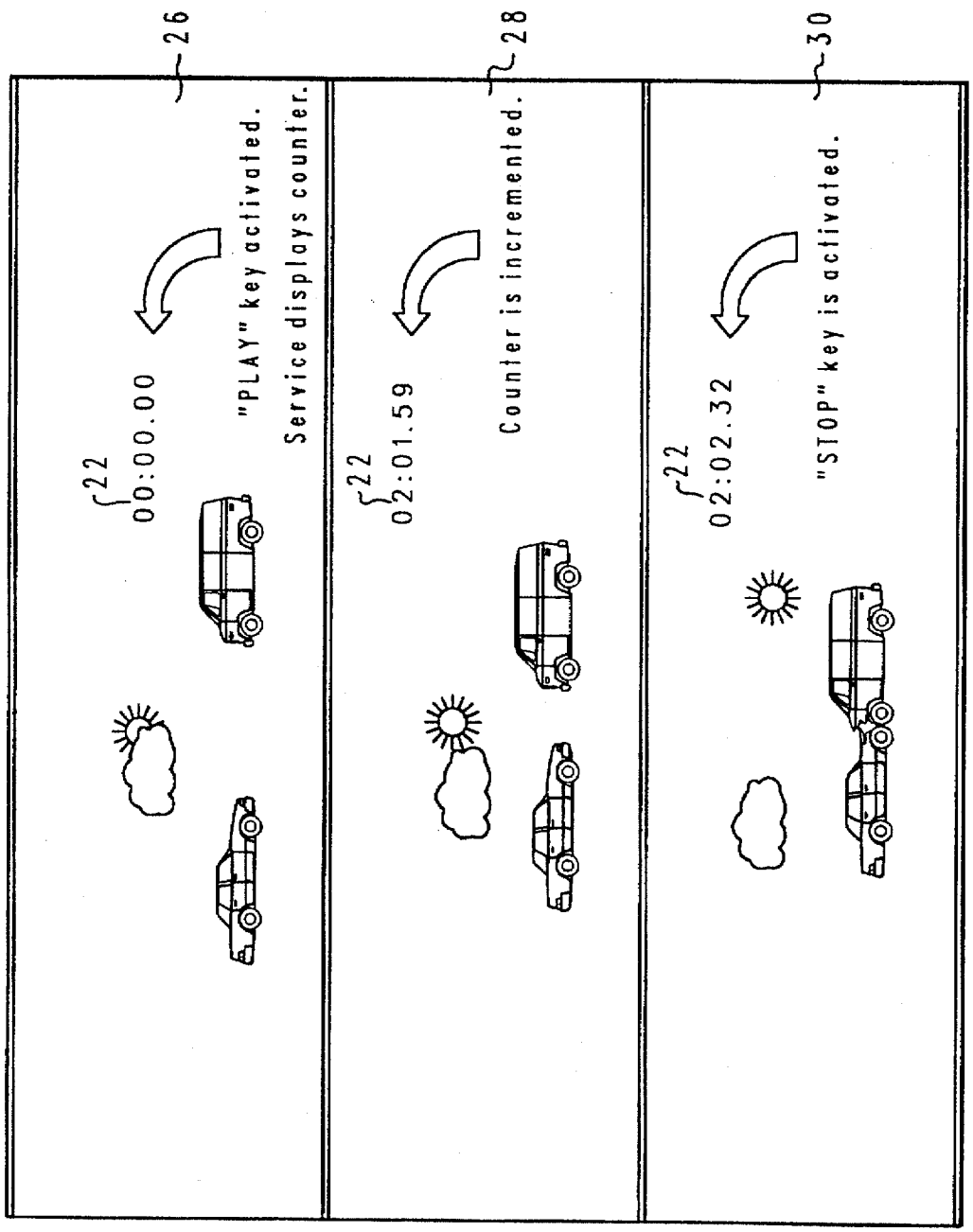
FIG. 2 is a pictorial representation of a multimedia presentation depicting the correlation of a play command with a particular rate of change of a digital counter in accordance with the method and system of the present invention.

FIG. 2 illustrates a pictorial representation of a correlation of a play command with a particular rate of change of a digital counter 22 which is provided in accordance with the method and system of the present invention. A multimedia presentation may be displayed on video display device 14 and accessed by a user utilizing various user interface commands each being associated with a presentation function such as play, stop, reverse, fast forward, or slow forward. User interface commands may be selected within data processing system 10 utilizing video display device 14 and keyboard 16. A user may then select a segment 24 of a multimedia presentation in any manner well known in the art. There is illustrated in a top frame 26 of segment 24 the activation of a "play" command within data processing system 10. Digital counter 22 may be displayed utilizing video display device 14 and is set at zero to mark the beginning of segment 26. Center frame 28 depicts digital counter 22 being incremented as segment 24 is accessed utilizing the user interface command "play." Bottom frame 30 illustrates a stop key within data processing system 10 being activated to indicate the end of segment 24. Digital counter 22 is then stopped in order to determine a particular rate of change of digital counter 22 during the accessing of segment 24 within a multimedia presentation utilizing a play command.

Figure 3:
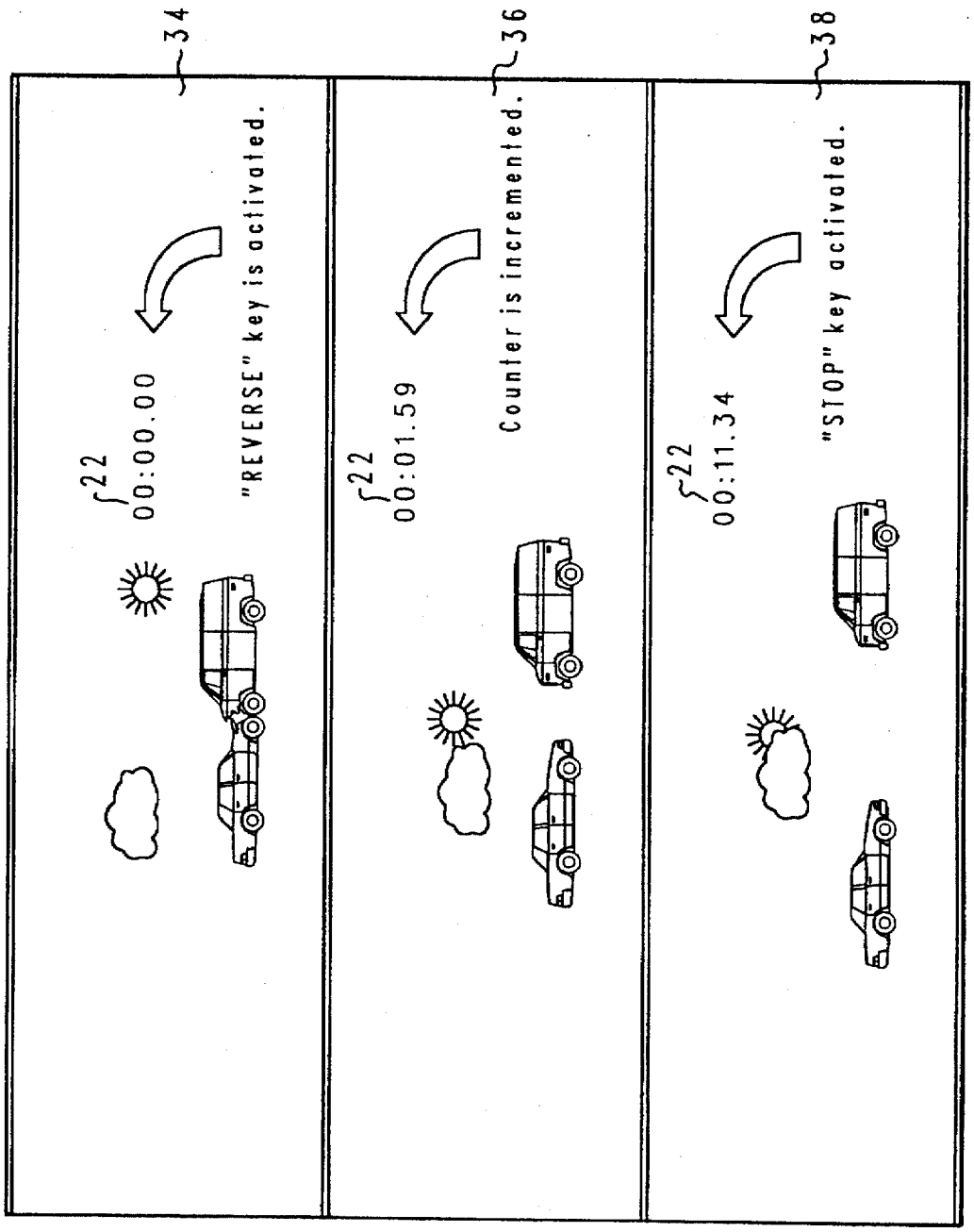
FIG. 3 is a pictorial representation of a multimedia presentation depicting the correlation of a reverse command with a particular rate of change of a digital counter in accordance with the method and system of the present invention.

Referring now to FIG. 3, there is illustrated a pictorial representation of a correlation of a reverse command within data processing system 10 with a particular rate of change of digital counter 22. A segment 32 within a multimedia presentation may be accessed utilizing user interface commands such as "reverse," which may be selected within data processing system 10 utilizing video display device 14 and keyboard 16. Top frame 34 of segment 32 illustrates a "reverse" command being activated within data processing system 10 while digital counter 22 is displayed and set to zero to indicate the beginning of segment 32. Center frame 36 depicts digital counter 22 being incremented as segment 32 within a multimedia presentation is accessed. A stop key may then be activated, within data processing system 10, utilizing video display device 14 and keyboard 16, as illustrated in bottom frame 38. Digital counter 22 is then stopped to indicate the end of segment 32.

The "reverse" command is then correlated with a particular rate of change of digital counter 22. A ratio of a rate of change of digital counter 22 for a reverse command, to a rate of change of digital counter 22 for a play command is then determined. As will be appreciated upon reference to the foregoing, additional user interface commands may be correlated with associated rates of change of digital counter 22 and a ratio of those rates of change, to a determined rate of change of a play command may then be determined in order to enable a user to randomly select particular segments within a multimedia presentation for viewing.

Figure 4:
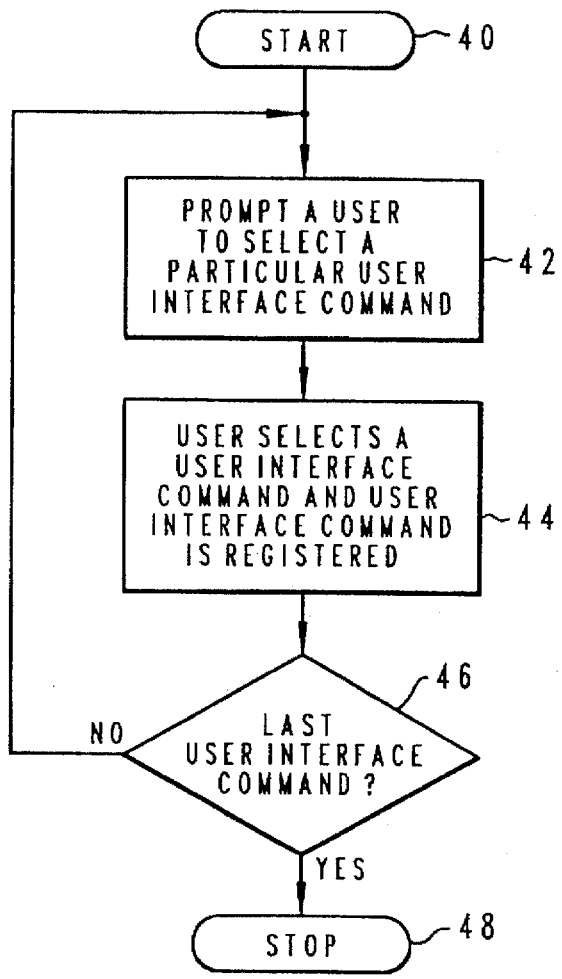
FIG. 4 is a high level flow chart depicting the registration process of each user interface command with the method and system of the present invention.

Referring now to FIG. 4, there is illustrated a high level flow chart depicting the registration of each user interface command with the method and system of the present invention. The process begins at block 40 and thereafter passes to block 42 which illustrates prompting a user to select a particular user interface command. Next, block 44 depicts a user selecting a user interface command which is associated with a particular presentation function such as play, stop, reverse, fast forward, or slow forward. The selected user interface command is registered in data processing system 10 in conjunction with an associated function. The process then passes to block 46 which illustrates a determination of whether or not a user has selected the last user interface command. If a determination is made that the last user interface command has not been selected, the process passes back to block 42. Referring again to block 44, if a determination is made that the last user interface command has been selected, the process terminates at block 48.

Figure 5A:
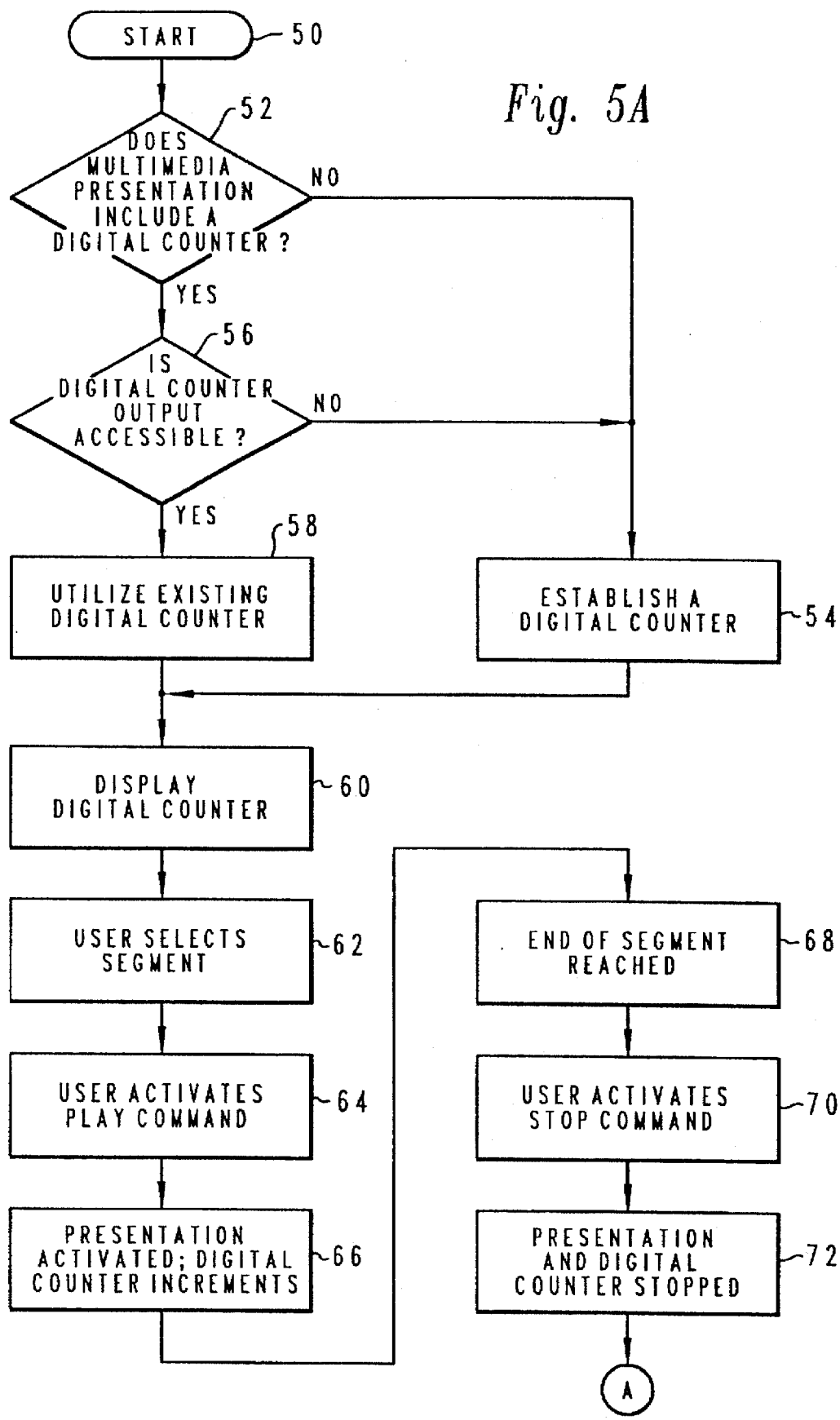
FIGS. 5A and 5B are high level flow charts depicting establishing a digital counter and correlating each user interface command with a particular rate of change of a digital counter in accordance with the method and system of the present invention.
Figure 5B:
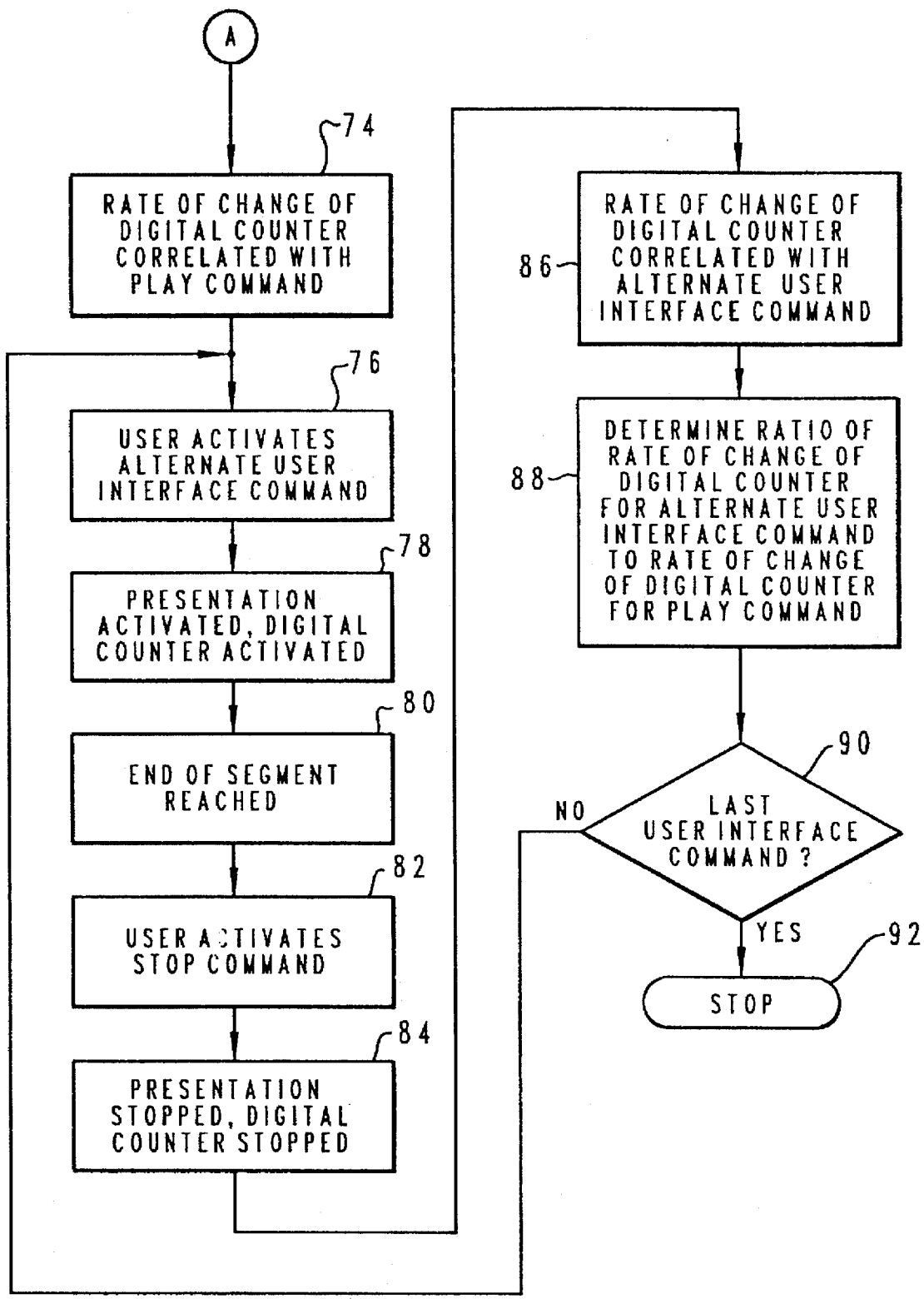

Referring now to FIG. 5, there is illustrated a high level flow chart depicting a correlation of selected user interface commands with particular rates of change of digital counter 22. The process begins at block 50 and thereafter passes to block 52 which depicts a determination of whether or not a multimedia presentation includes a digital counter. In the event a multimedia presentation does not include a digital counter, the process passes to block 54, which illustrates the establishing of a digital counter.

Referring again to block 52, if a determination is made that a selected multimedia presentation does include a digital counter, the process passes to block 56, which depicts a determination of whether or not the output of the existing digital counter is accessible to data processing system 10. In the event the output of the existing digital counter is not accessible, the process passes to block 54 which illustrates the establishing of a digital counter. Referring again to block 56, if a determination is made that the output of the existing digital counter is accessible to data processing system 10, the process then passes to block 58 which depicts utilizing the existing digital counter.

Next, the process passes to block 60 which illustrates the displaying of a digital counter. Thereafter, block 62 depicts the selection by a user of a particular segment of a multimedia presentation. The process passes to block 64 which illustrates a user activating a play command within the processing system 10. Next, block 66 depicts a multimedia presentation being activated and the digital counter being incremented. The process then passes to block 68 which illustrates the end of a segment of a multimedia presentation being reached.

The process next passes to block 70 which depicts a user activating a stop command within the processing system 10. Thereafter, block 72 illustrates the multimedia presentation and the digital counter being stopped. The process then passes to block 74, which depicts a correlation of a rate of change of the digital counter with a play command.

Next, block 76 illustrates a user activating an alternate user interface command. Block 78 is then utilized to depict a multimedia presentation and the digital counter being activated. The process then passes to block 80 which illustrates the end of a segment of a multimedia presentation being reached. The process then passes to block 82 which depicts a user activating a stop command.

The multimedia presentation and the digital counter are then stopped as illustrated in block 84. Thereafter, block 86 depicts the correlation of a rate of change of the digital counter with an alternate user interface command. Block 88 then illustrates a determination of a ratio of a rate of change of a digital counter for the alternate user command, to a rate of change of a digital counter for a play command.

Control then passes to block 90 which depicts a determination of whether or not the last user interface command has been activated. In the event the last user interface command has not been activated, the process passes to block 76. Referring again to block 90, if a determination is made that the last user interface command has been activated, the process then terminates, as illustrated at block 92.

Figure 6:
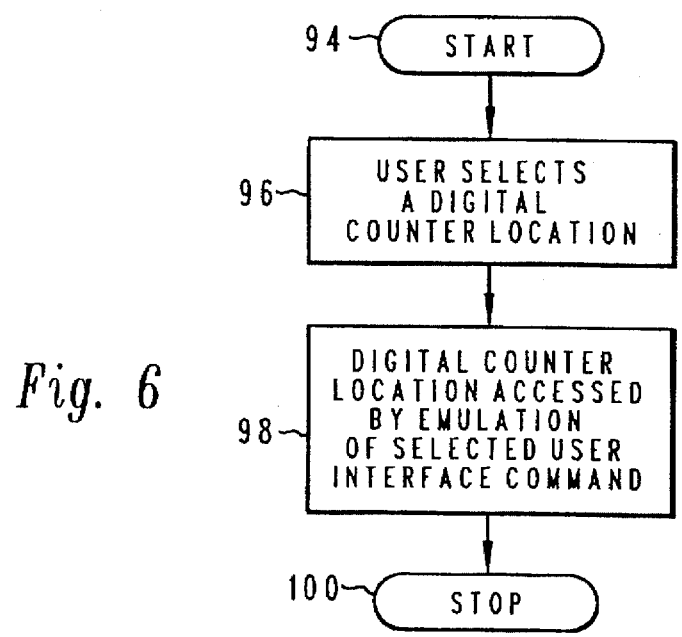
FIG. 6 is a high level flow chart depicting the activation of a multimedia presentation by emulating user interface commands in accordance with the method and system of the present invention.

Referring now to FIG. 6, there is illustrated a high level flow chart depicting a multimedia presentation being accessed by emulation of selected user interface commands. The process begins at block 94 and thereafter passes to block 96 which depicts a user selecting a digital counter location. Next, block 98 depicts the digital counter location being accessed by emulating selected user interface commands. The process then terminates at block 100.

Upon reference to the foregoing those skilled in the art will appreciate that the Applicants have disclosed a method and system whereby a digital counter may be established and user interface commands may be correlated with particular rates of change of a digital counter so that particular segments of a multimedia presentation may be accessed in a random manner utilizing the digital counter and the user interface commands.

While the invention has been particularly shown and described with reference to a preferred embodiment, it will be understood by those skilled in the art that various changes in form and detail may be made therein without departing from the spirit and scope of the invention.

We claim:

1. A method in a computer system for efficiently designating and retrieving a plurality of particular segments of a multimedia presentation, wherein said multimedia presentation is controlled by said computer system by means of operation of a plurality of user interface commands, each of said plurality of user interface commands having a selected presentation function associated therewith, said method comprising the steps of:

establishing a digital counter within said computer system;

determining a rate of change of said digital counter associated with operation of each of said plurality of user interface commands; and, accessing individual ones of said plurality of particular segments of said multimedia presentation in a random order utilizing said digital counter, said determined rate of change of said digital counter and said plurality of user interface commands.

2. The method in a computer system for efficiently designating and retrieving a plurality of particular segments of a multimedia presentation according to claim 1, further comprising the step of selectively displaying said digital counter.

3. The method in a computer system for efficiently designating and retrieving a plurality of particular segments of a multimedia presentation according to claim 1, wherein the step of determining a rate of change of said digital counter, comprises the steps of:

(a) selecting one of said plurality of particular segments;

(b) selecting one of said plurality of user interface commands;

(c) accessing said selected one of said plurality of particular segments utilizing said selected one of said plurality of user interface commands;

(d) determining a rate of change of said digital counter during said step of accessing said selected one of said plurality of particular segments; and, (e) associating said selected one of said plurality of user interface commands with said rate of change of said digital counter.

4. The method in a computer system for efficiently designating and retrieving a plurality of particular segments of a multimedia presentation according to claim 3, further including the step of registering each of said plurality of user interface commands within said computer system in conjunction with a selected function associated therewith.

5. The method in a computer system for efficiently designating and retrieving a plurality of particular segments of a multimedia presentation according to claim 3, further comprising repeating said steps a, b, c, and d for each of said plurality of user interface commands.

6. A method in a computer system for efficiently designating and retrieving a plurality of particular segments of a multimedia presentation, wherein said multimedia presentation is controlled by said computer system by means of operation of a plurality of user interface commands, each of said plurality of user interface commands having a selected presentation function associated therewith, said method comprising the steps of:

determining whether said multimedia presentation includes an existing digital counter, said existing digital counter having an output;

determining whether said output is accessible to said computer system;

determining a rate of change of said existing digital counter associated with operation of each of said plurality of user interface commands in response to a determination that said output is accessible; and accessing individual ones of said plurality of particular segments of said multimedia presentation in a random order utilizing said existing digital counter, said determined rate of change of said existing digital counter and said plurality of user interface commands.

7. The method in a computer system for efficiently designating and retrieving a plurality of particular segments of a multimedia presentation according to claim 6, further comprising the step of selectively displaying said existing digital counter.

8. The method in a computer system for efficiently designating and retrieving a plurality of particular segments of a multimedia presentation according to claim 6, wherein the step of determining a rate of change of said existing digital counter, comprises the steps of:

(a) selecting one of said plurality of particular segments;

(b) selecting one of said plurality of user interface commands;

(c) accessing said selected one of said plurality of particular segments utilizing said selected one of said plurality of user interface commands;

(d) determining a rate of change of said existing digital counter during said step of accessing said selected one of said plurality of particular segments; and, (e) associating said selected one of said plurality of user interface commands with said rate of change of said existing digital counter.

9. The method in a computer system for efficiently designating and retrieving a plurality of particular segments of a multimedia presentation according to claim 8, further including the step of registering each of said plurality of user interface commands within said computer system in conjunction with a selected function associated therewith.

10. The method in a computer system for efficiently designating and retrieving a plurality of particular segments of a multimedia presentation according to claim 8, further comprising repeating steps a, b, c and d for each of said plurality of user interface commands.

11. A computer system for efficiently designating and retrieving a plurality of particular segments of a multimedia presentation, wherein said multimedia presentation is controlled by said computer system by means of operation of a plurality of user interface commands, each of said plurality of user interface commands having a selected presentation function associated therewith, said computer system comprising:

means for establishing a digital counter within said computer system;

means for determining a rate of change of said digital counter associated with operation of each of said plurality of user interface commands; and, means for accessing individual ones of said plurality of particular segments of said multimedia presentation in a random order utilizing said digital counter said determined create of change of said digital counter and said plurality of user interface commands.

12. A computer system for efficiently designating and retrieving a plurality of particular segments of a multimedia presentation according to claim 11, further comprising means for selectively displaying said digital counter.

13. A computer system for efficiently designating and retrieving a plurality of particular segments of a multimedia presentation according to claim 11, wherein said means for determining a rate of change of said digital counter, associated with operation of each of said plurality of user interface commands comprises:

(a) means for selecting one of said plurality of particular segments;

(b) means for selecting one of said plurality of user interface commands;

(c) means for accessing said selected one of said plurality of particular segments utilizing said selected one of said plurality of user interface commands;

(d) means for determining a rate of change of said digital counter during operation of a selected one of said plurality of particular segments; and, (e) means for associating said selected one of said plurality of user interface commands with said determined rate of change of said digital counter.

14. A computer system for efficiently designating and retrieving a plurality of particular segments of a multimedia presentation according to claim 13, further including means for registering each of said plurality of user interface commands within said computer system in conjunction with a selected function associated therewith.

15. A computer system for efficiently designating and retrieving a plurality of particular segments of a multimedia presentation according to claim 13, further comprising means for utilizing said elements a, b, c, and d for each of said plurality of user interface commands.

16. A computer system for efficiently designating and retrieving a plurality of particular segments of a multimedia presentation, wherein said multimedia presentation is controlled by said computer system by means of operation of a plurality of user interface commands, each of said plurality of user interface commands having a selected presentation function associated therewith, said computer system comprising:

means for determining whether said multimedia presentation includes an existing digital counter, said existing digital counter having an output;

means for determining whether said output is accessible to said computer system;

means for determining a rate of change of said existing counter associated with operation of each of said plurality of user interface commands in response to a determination that said output is accessible; and, means for accessing individual ones of said plurality of particular segments of said multimedia presentation in a random order utilizing said existing digital counter, said determined rate of change of said existing counter and said plurality of user interface commands.

17. A computer system for efficiently designating and retrieving a plurality of particular segments of a multimedia presentation according to claim 16, further comprising means for selectively displaying said existing digital counter.

\* \* \* \* \*